United States Patent
Li

(10) Patent No.: US 10,749,774 B1
(45) Date of Patent: Aug. 18, 2020

(54) REDUCING DATA STORAGE AND NETWORK TRAFFIC WITH DATA COMPRESSION

(71) Applicant: Verizon Patent and Licensing Inc., Arlington, VA (US)

(72) Inventor: Wei Li, Rolleston (NZ)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/295,619

(22) Filed: Mar. 7, 2019

(51) Int. Cl.
H04L 12/26 (2006.01)
H04L 29/08 (2006.01)

(52) U.S. Cl.
CPC ........ *H04L 43/0805* (2013.01); *H04L 43/028* (2013.01); *H04L 43/12* (2013.01); *H04L 67/12* (2013.01); *H04L 67/2861* (2013.01)

(58) Field of Classification Search
CPC ..... H04L 67/12; H04L 1/0002; H04L 1/0041; H04L 5/0064; H04L 67/1097; H04L 1/18; H04L 25/0226; H04L 67/10; H04L 12/282; H04L 12/2829; H04L 12/2834; H04L 27/04; H04L 29/08657; H04L 41/0631; H04L 41/142; H04L 49/25; H04L 63/0227; H04L 63/0245; H04L 67/04; H04L 67/125; H04L 67/18; H04L 2209/805; H04L 67/20; H04L 67/26; H04L 67/306; H04L 12/10; H04L 12/12; H04L 1/1887; H04L 2209/38; H04L 2209/84; H04L 2463/141; H04L 41/044; H04L 41/0893; H04L 43/50; H04L 51/066; H04L 63/0435; H04L 63/083; H04L 63/0876; H04L 63/1458; H04L 67/1095; H04L 67/22; H04L 7/0083; H04L 9/0637; H04L 9/0833; H04L 9/0838; H04L 9/0861; H04L 9/088; H04L 9/0894; H04L 9/321
See application file for complete search history.

(56) References Cited

U.S. PATENT DOCUMENTS

| | | | | |
|---|---|---|---|---|
| 2015/0157230 | A1* | 6/2015 | Tseng | A61B 5/6898 600/372 |
| 2016/0330534 | A1* | 11/2016 | White, Jr. | H04Q 9/00 |
| 2018/0025135 | A1* | 1/2018 | Odom | G06F 21/121 726/28 |
| 2019/0182368 | A1* | 6/2019 | Tang | H04L 69/22 |
| 2019/0347358 | A1* | 11/2019 | Mishra | G06F 3/167 |

* cited by examiner

*Primary Examiner* — Djenane M Bayard

(57) ABSTRACT

A data collection device can determine that a connection is unavailable between the data collection device and a data processing platform. The data collection device can obtain, after the connection is unavailable, a plurality of readings. The data collection device can determine, based on determining that the connection is unavailable, to discard one or more readings from the plurality of readings to form a set of readings. The data collection device can store, based on determining that the connection is unavailable, the set of readings without storing the one or more readings. The data collection device can determine, after storing the set of readings, that the connection is available. The data collection device can transmit, based on determining that the connection is available, the set of readings to the data processing platform.

20 Claims, 6 Drawing Sheets

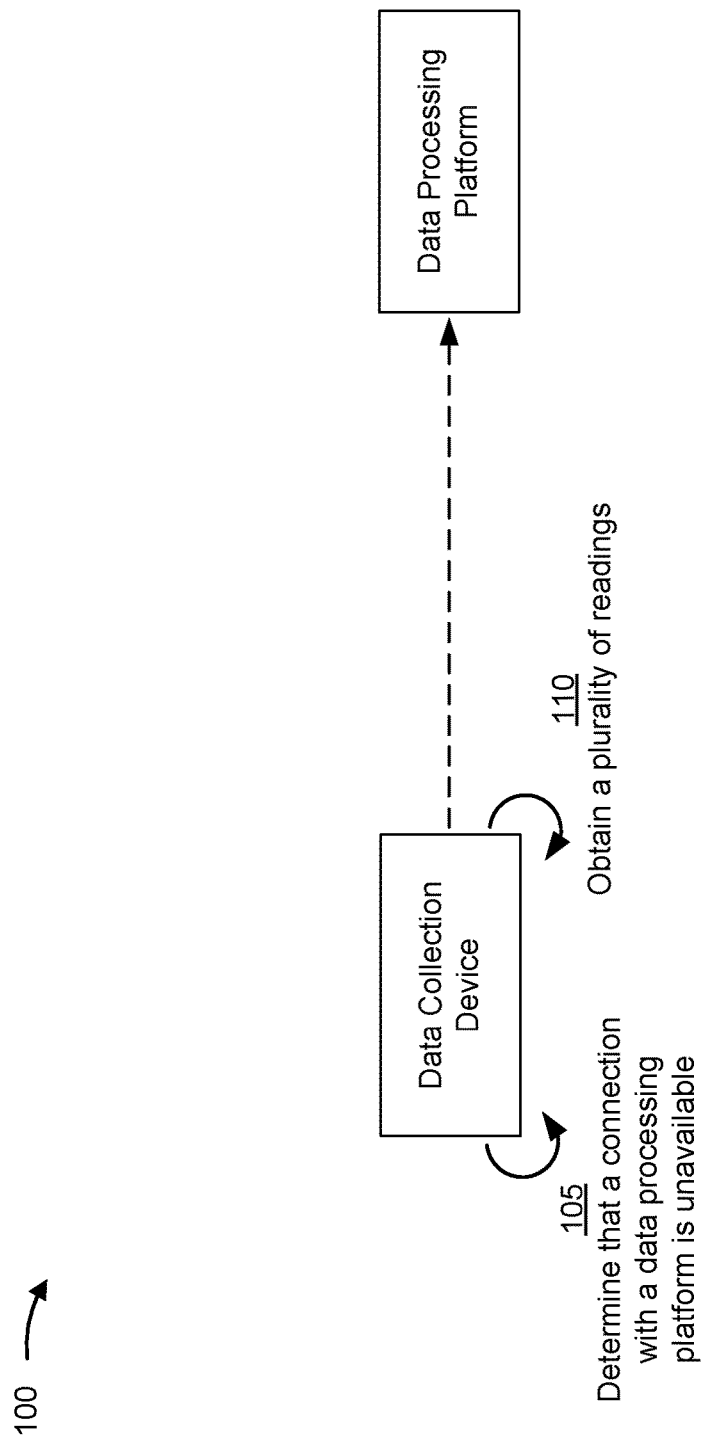

REDUCING DATA STORAGE AND NETWORK TRAFFIC WITH DATA COMPRESSION

BACKGROUND

Data compression involves encoding information using fewer bits than the original representation of the information. Compression can be either lossless or lossy. Lossless compression reduces bits by identifying and eliminating statistical redundancy such that no information is lost in lossless compression. Lossy compression reduces bits by removing unnecessary or less important information.

BRIEF DESCRIPTION OF THE DRAWINGS

FIGS. 1A-1C are diagrams of one or more example implementations described herein.

DETAILED DESCRIPTION OF PREFERRED EMBODIMENTS

Figure 1B:
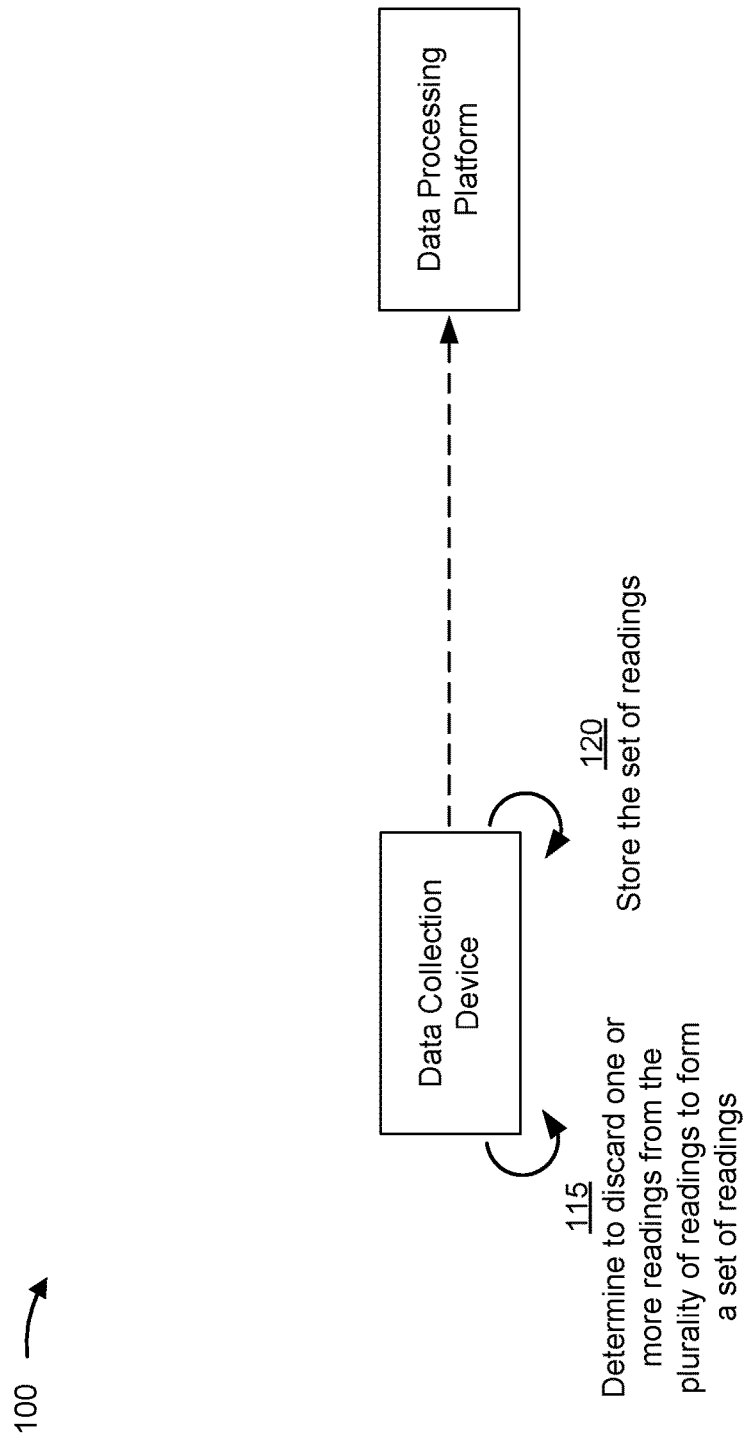

The following detailed description of example implementations refers to the accompanying drawings. The same reference numbers in different drawings can identify the same or similar elements.

Measurable parameters relating to an environment can be detected and collected, as readings, by a sensor device. The readings collected by the sensor device can be transmitted to a remotely-located device as a continuous stream, or in batches, for processing and/or analysis. Sometimes, multiple sensor devices transmit readings to the remotely-located device, thereby resulting in network congestion and/or a burdening of computing resources of the remotely-located device. For example, readings collected by thousands or millions of sensor devices and transmitted to the remotely-located device can overwhelm a network associated with the remotely-located device and/or overwhelm computing resources of the remotely-located device. As a consequence, the remotely-located device can experience processing delays, crashing, and/or failure.

Furthermore, sometimes the sensor device and the remotely-located device can lose connectivity. For example, the sensor device and the remotely-located device can lose connectivity due to a poor signal (e.g., a poor wireless signal) experienced by the sensor device, a loss of functionality of a network associated with the sensor device and/or the remotely-located device (e.g., due to network congestion), a failure of the remotely-located device (e.g., due to an over-burdening of computing resources of the remotely-located device), and/or the like. In such scenarios, a storage capacity of the sensor device might be insufficient to store all readings collected by the sensor device during a time period when the connection is unavailable. As a result, readings collected by the device can be lost, thereby reducing reliability and functionality of systems that use the readings collected by the sensor device.

Some implementations, described herein, include a data collection device (e.g., a sensor device) that obtains a plurality of readings and discards one or more readings from the plurality of readings to form a set of readings that is to be transmitted to a data processing platform. In some implementations, the data collection device can perform a data compression technique to determine the one or more readings to discard. In this way, data transmissions, and/or a size of data transmissions, from the data collection device to the data processing platform can be reduced, thereby reducing congestion on a network associated with the data processing platform and/or the data collection device as well as reducing a burden on computing resources (e.g., processing resources, memory resources, and/or the like) of the data processing platform. In addition, the data collection device (e.g., using the data compression technique) can store the set of readings over a time period (e.g., a time period in which a connection between the data collection device and the data processing platform is unavailable). In this way, the set of readings can provide an approximation of the plurality of readings obtained by the data collection device while using less storage resources than would otherwise be used by the plurality of readings. Accordingly, information loss that would otherwise occur due to limitations in storage capacity of the data collection device can be reduced, thereby improving performance and functionality of systems that use the readings of the data collection device.

Figure 1C:
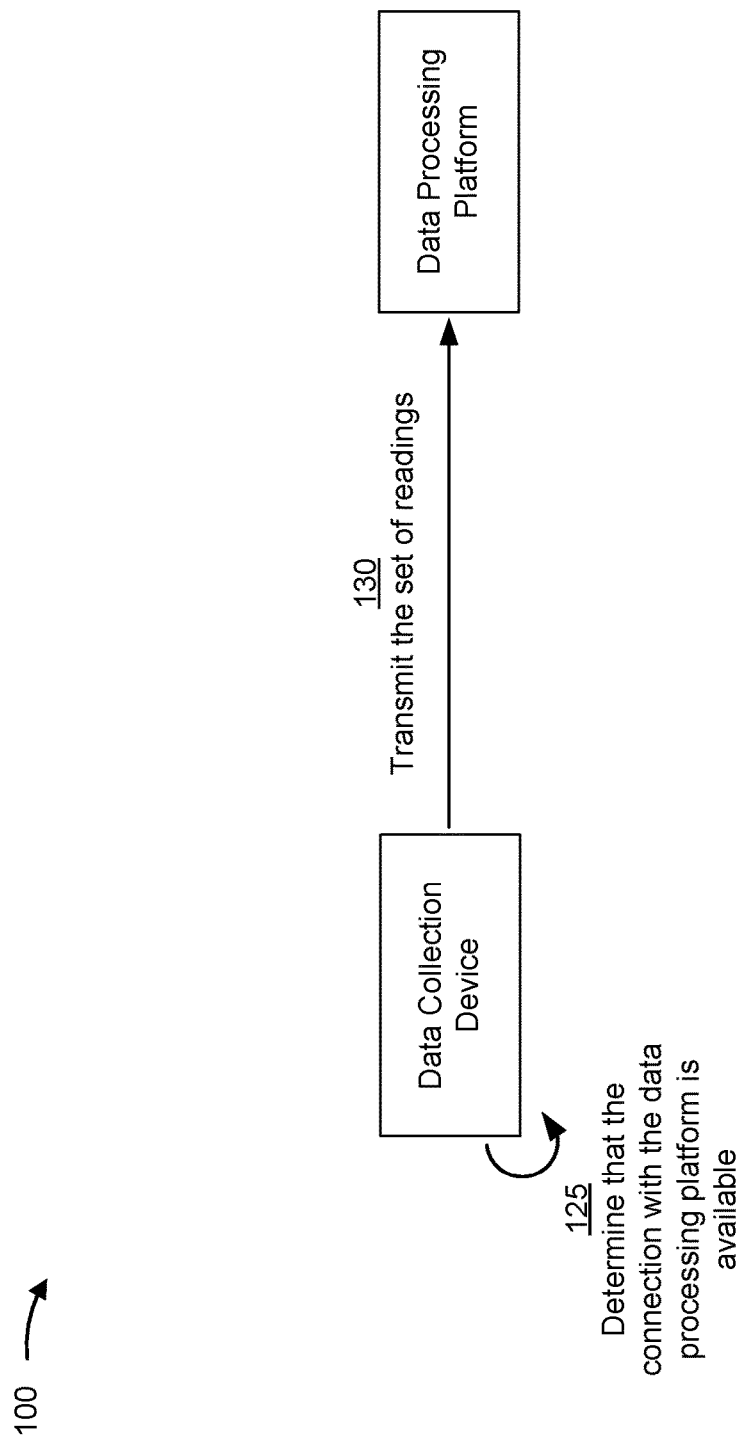

FIGS. 1A-1C are diagrams of one or more example implementations 100 described herein. As shown in FIGS. 1A-1C, example implementation(s) 100 can include a data collection device and a data processing platform. The data collection device can obtain a plurality of readings (e.g., using a sensor) and transmit a set of readings (e.g., a set of readings that discards one or more readings from the plurality of readings) to the data processing platform. The data processing platform can process the set of readings received from the data collection device.

In some implementations, the data collection device is a sensor device (e.g., a device that includes one or more sensors, such as a temperature sensor, a barometer, a rain gauge, a hydrometer, a chemical sensor, and/or the like). For example, the data collection device can be an internet of things (IoT) device, a telematics device, a user device (e.g., a smart phone, a tablet computer, a handheld computer, a wearable communication device (e.g., a smart wristwatch, a pair of smart eyeglasses, etc.), and/or the like), and/or the like. In some implementations, the data collection device is one of a plurality of data collection devices that collect and transmit readings to the data processing platform.

In some implementations, the data processing platform (e.g., a data processing platform that includes one or more server devices) is located remotely from the data collection device. Accordingly, the data collection device can communicate readings (e.g., readings obtained by the data collection device) to the data processing platform via a connection (e.g., a wired connection and/or a wireless connection) between the data collection device and the data processing platform. In some implementations, the data processing platform can receive and process readings from hundreds, thousands, millions, or more data collection devices.

In some implementations, the data collection device can collect and transmit readings to the data processing platform as a continuous or a semi-continuous stream. Additionally, or alternatively, the data collection device can collect readings, store the readings for a time period, and transmit the readings to the data processing platform in batches. For example, when a connection between the data collection device and the data processing platform is available, the data collection device can transmit readings as a continuous or a semi-continuous stream and/or in batches to the data processing platform. In such cases, the data collection device can collect, store, and/or transmit readings to the data processing platform with or without applying a data compression technique to the readings.

As shown in FIG. 1A, and by reference number 105, the data collection device can determine that the connection between the data collection device and the data processing platform is unavailable. For example, the connection is unavailable when the data collection device cannot communicate with the data processing platform via the connection, such as when the data collection device cannot connect to a network (e.g., due to a poor signal from a wireless network), a network associated with the data collection device and/or the data processing platform experiences a loss in functionality, and/or the data processing platform cannot connect to a network (e.g., due to a failure or an error state of the data processing platform).

In some implementations, the data collection device can determine that the connection is unavailable using a process associated with a communication interface of the data collection device (e.g., a modem). In some implementations, the data collection device can determine that the connection is unavailable after the connection was previously available. For example, the data collection device can determine that the connection is unavailable after transmitting one or more readings to the data processing platform via the connection when the connection was available. In some implementations, prior to transmitting the one or more readings, the data collection device can perform a data compression technique, as described below, and transmit (e.g., in real time) to the data processing platform readings that are not discarded by the data compression technique.

As shown by reference number 110, the data collection device can obtain a plurality of readings. For example, after determining that the connection between the data collection device and the data processing platform is unavailable, the data collection device can obtain the plurality of readings. In some implementations, the data collection device can obtain the plurality of readings using one or more sensors associated with the data collection device. The data collection device can store (e.g., temporarily store) the plurality of readings in a memory of the data collection device and/or a data structure (e.g., a database, a linked list, a table, and/or the like) associated with the data collection device.

The data collection device can obtain the plurality of readings at regular intervals (e.g., 1 second intervals, 1 minute intervals, 10 minute intervals, etc.). For example, the data collection device can obtain a first reading at a first time, a second reading at a second time (e.g., after the first time), a third reading at a third time (e.g., after the second time), etc. such that a time difference between the first time and the second time is equal to a time difference between the second time and the third time. In some implementations, the data collection device can be configured to collect discrete readings at regular intervals. In such a case, the plurality of readings can be one or more of the discrete readings collected by the data collection device. Additionally, or alternatively, the data collection device can be configured to collect readings as a continuous or a semi-continuous stream of readings. In such a case, the data collection device can obtain the plurality of readings as discrete readings from the continuous or the semi-continuous stream of readings (e.g., at regular intervals). Additionally, or alternatively, the data collection device can be configured to collect readings at periodic and irregular intervals, such as upon the occurrence of a trigger (e.g., an event).

In some implementation, the plurality of readings can identify a measurable parameter relating to an environment of the data collection device. For example, the readings can represent a temperature, a humidity, a pressure, a water level, a concentration of a chemical, etc. of the environment of the data collection device.

In some implementations, the data collection device can obtain the plurality of readings before determining that the connection between the data collection device and the data processing platform is unavailable. For example, the data collection device can obtain the plurality of readings and determine that the connection is unavailable after obtaining the plurality of readings but before transmitting the plurality of readings to the data processing platform. In some implementations, the data collection device can obtain the plurality of readings without determining that the connection between the data collection device and the data processing platform is unavailable. In such cases, the data collection device can perform a compression technique on the plurality of readings, as described below, without determining whether the connection between the data collection device and the data processing platform is available or unavailable.

As shown in FIG. 1B, and by reference number 115, the data collection device can determine to discard one or more readings from the plurality of readings to form a set of readings. For example, based on determining that the connection between the data collection device and the data processing platform is unavailable, the data collection device can determine to discard one or more readings. Accordingly, the set of readings can exclude one or more readings obtained by the data collection device such that a number of readings included in the set of readings is less than a number of readings included in the plurality of readings. In this way, readings of the data collection device can be compressed to thereby conserve network resources associated with the transmission of the readings and/or computing resources associated with the storage and/or processing of the readings.

In some implementations, the data collection device can determine whether to discard a reading based on a data compression technique. For example, the data collection device can determine, using the data compression technique, whether to discard a reading when the reading is a second reading between a first reading and a third reading. The first reading can be associated with a first time, the second reading can be associated with a second time that is after the first time, and the third reading can be associated with a third time that is after the second time. Additionally, the first reading, the second reading, and the third reading can be consecutive readings obtained by the data collection device. After obtaining the third reading, the data collection device can determine, using the data compression technique, whether to discard the second reading based on a comparison of the second reading and one or more of the first reading or the third reading.

In some implementations, the data collection device can perform the data compression technique by determining a maximum difference ($d_{max}$) of one of a first difference (e.g., an absolute difference) between the first reading ($r_1$) and the second reading ($r_2$) (e.g., $|r_2-r_1|$) or a second difference (e.g., an absolute difference) between the second reading and the third reading ($r_3$) (e.g., $|r_3-r_2|$). The maximum difference provides a measure of a furthest distance between the second reading and an adjacent reading (i.e., the first reading or the third reading). According to the data compression technique, the data collection device also can determine a difference (d) (e.g., an absolute difference) between the second reading and a value derived from linear interpolation based on the first reading at the first time ($t_1$), the second time ($t_2$), and the third reading at the third time ($t_3$) (e.g., $$\left| r_2 - \left( r_1 + \frac{(r_3 - r_1) \times (t_2 - t_1)}{(t_3 - t_1)} \right) \right|).$$

The difference provides a measure of a distance between the second reading and an interpolated value for the second time (e.g., a theoretical value for the second time if the plurality of readings were linear).

According to the data compression technique, the data collection device then can determine whether the difference is less than or equal to the maximum difference multiplied by a weight (e.g., $d \leq d_{max} \times w$). This provides an indication of whether the distance between the second reading and the interpolated value is less than or equal to a measure of precision that is based on the maximum difference. The weight can represent a percentage, such as a value greater than or equal to 0 and less than or equal to 1 (e.g., ⅕, ¼, ⅓, etc.). A lesser weight provides a higher measure of precision (i.e., the second reading is less likely to be discarded, thereby resulting in less compression) and a greater weight provides a lower measure of precision (i.e., the second reading is more likely to be discarded, thereby resulting in more compression). According to the data compression technique, the data collection device can determine to discard the second reading based on determining that the difference is less than or equal to the maximum difference multiplied by the weight. In some implementations, the data collection device can determine to discard the second reading based on determining that the difference is less than or equal to a measurement error value of the data collection device.

In this way, the data compression technique provides a simple, low latency compression technique that uses basic arithmetic operations, thereby conserving computing resources of the data collection device that would otherwise be wasted using a complex compression technique. Accordingly, the data compression technique can be useful when the data collection device has limited processing or memory resources, such as when the data collection device is an IoT device. Furthermore, the data compression technique can reduce a data set (e.g., a plurality of readings) with minimal information loss, or no information loss, thereby improving data compression fidelity and reducing losses of precision.

In some implementations, the data collection device can perform the data compression technique as an iterative process. For example, after determining to discard the second reading, the data collection device can perform the data compression technique on the third reading, a fourth reading (e.g., a fourth reading associated with a fourth time that is after the third time), and a fifth reading (e.g., a fifth reading associated with a fifth time that is after the fourth time) to determine whether to discard the fourth reading, and so forth. Alternatively, based on determining not to discard the second reading (i.e., the difference is greater than the maximum difference multiplied by the weight), the data collection device can perform the data compression technique on the second reading, the third reading, and the fourth reading to determine whether to discard the third reading, and so forth.

After performing one or more iterations of the data compression technique, the data collection device can form and/or update the set of readings. The set of readings can include one or more readings from the plurality of readings that were not discarded by the data compression technique.

In some implementations, the data collection device can determine to discard one or more readings from the plurality of readings (e.g., by performing the data compression technique) during a time period when the connection between the data collection device and the data processing platform is available. In other words, the data collection device can perform the data compression technique on readings regardless of whether the connection is available or unavailable. In this way, a number of data transmissions, and/or a size of data transmissions, from the data collection device can be reduced and/or a processing burden on the data processing platform can be reduced.

In some implementations the data collection device can perform the data compression technique on more than three readings (e.g., 5 readings, 10 readings, 50 readings, etc.). For example, the data collection device can perform the data compression technique on a first reading, a second reading, a third reading, and a fourth reading to determine whether to discard the second reading and the third reading, and so forth. For example, the data collection device can determine a maximum difference between the first reading and the second reading, the second reading and the third reading, or the third reading and the fourth reading. The data collection device can compare, as described above, the maximum difference and a difference between the second reading and an interpolated value for the second reading (e.g., to determine whether to discard the second reading) or a difference between the third reading and an interpolated value for the third reading (e.g., to determine whether to discard the third reading).

In some implementations, the data collection device can perform the data compression technique on readings that identify multidimensional parameters (e.g., points in two-dimensional space or three-dimensional space). For example, the data collection device can perform the data compression technique on a first point, a second point, and a third point by determining a maximum difference, as a straight-line distance (i.e., Euclidean distance), between the first point and the second point or the second point and the third point. The data collection device can compare, as described above, the maximum difference and a difference, as a straight-line distance, between the second point and an interpolated value for the second point (e.g., to determine whether to discard the second point).

As shown by reference number 120, the data collection device can store the set of readings. The data collection device can store, or cause another device to store, the set of readings in a data structure (e.g., a database, a linked list, a table, and/or the like) that is accessible to the data collection device. In some implementations, the data collection device can perform the data compression technique on the plurality of readings (e.g., more than three readings) obtained by the data collection device and store one or more of the plurality of readings that are not discarded as the set of readings. In some implementations, the plurality of readings can be stored in the data structure to await processing with the data compression technique. In such a case, the data collection device can discard (e.g., delete) one or more readings of the plurality of readings according to the data compression technique to thereby form the set of readings stored by the data collection device.

In some implementations, the data collection device can perform the data compression technique on the set of readings stored by the data collection device. For example, the set of readings can be associated with a storage total (e.g., an amount of bytes) and the data collection device can determine whether the storage total satisfies a threshold value (e.g., a percentage of a storage capacity of the data collection device, such as 80%, 90%, 95%, etc.). Continuing with the previous example, based on determining that the storage total satisfies the threshold value, the data collection device can discard one or more readings of the set of readings (e.g., by performing one or more iterations of the data compression technique on the set of readings). In this way, the data collection device can recursively perform the data compression technique to reduce the storage total of the set of readings. This can be useful when the storage total of the set of readings is reaching the storage capacity of the data collection device and the connection between the data collection device and the data processing platform remains unavailable.

As shown in FIG. 1C, and by reference number 125, the data collection device can determine that the connection between the data collection device and the data processing platform is available. For example, the data collection device can determine that the connection is available using a process associated with a communication interface of the data collection device (e.g., a modem).

As shown by reference number 130, the data collection device can transmit the set of readings to the data processing platform. For example, after determining that the connection is available, the data collection device can transmit the set of readings to the data processing platform via the connection. In some implementations, the data collection device can individually transmit readings of the set of readings. Additionally, or alternatively, the data collection device can transmit the set of readings as a batch.

In some implementations, the data processing platform can discard one or more readings received from the data collection device. For example, a device of the data processing platform (e.g., a gateway device) can perform the data compression technique on readings received from the data collection device. This can be useful to further compress the readings before processing by the data processing platform (e.g., when the data processing platform is receiving a high volume of readings, such as from a plurality of data collection devices and/or during a peak usage of the data processing platform). In some implementations, the readings received from the data collection device are not compressed by the data collection device, and the data processing platform (e.g., a gateway device of the data processing platform) can perform an initial compression of the readings (e.g., using the data compression technique). In some implementations, the data processing platform can perform a data smoothing technique (e.g., Kalman filtering) on the readings received from the data collection device (e.g., to remove noise) prior to processing the readings.

In some implementations, the data processing platform can perform a data decompression technique on readings received from the data collection device. For example, the data processing platform can perform interpolation based on the set of readings transmitted by the data collection device. For example, if the plurality of readings were obtained by the data collection device at regular intervals, the data processing platform can interpolate a data point between consecutive readings of the set of readings (e.g., the data point can be an average of the consecutive readings). Accordingly, in some implementations, the data collection device also can transmit metadata associated with the set of readings, such as a length of an interval used in obtaining the plurality of readings.

The data processing platform can process the set of readings (e.g., the set of readings received from the data collection device, readings resulting from compression of the set of readings performed by the data processing platform, and/or readings resulting from decompression of the set of readings performed by the data processing platform). In some implementations, the data processing platform can provide one or more readings, and/or information relating to one or more readings, to a user device (e.g., a user device associated with the data collection device). In some implementations, the data processing platform can permit one or more third-party devices to access the set of readings, such as via an application programming interface (API). In some implementations, the data processing platform can perform an analysis of the set of readings to generate a report, a statistic, a forecast, etc. In some implementations, the data processing platform can cause the data collection device, or another device that is associated with the data collection device, to perform one or more actions based on the set of readings. For example, the data processing platform can cause the data collection device, or another device that is associated with the data collection device, to adjust a temperature control based on the set of readings indicating a temperature outside of a tolerance, adjust a pressure control based on the set of readings indicating a pressure outside of a tolerance, adjust a rate at which readings are obtained, etc.

As indicated above, FIGS. 1A-1C are provided as examples. Other examples can differ from what is described with regard to FIGS. 1A-1C.

Figure 2:
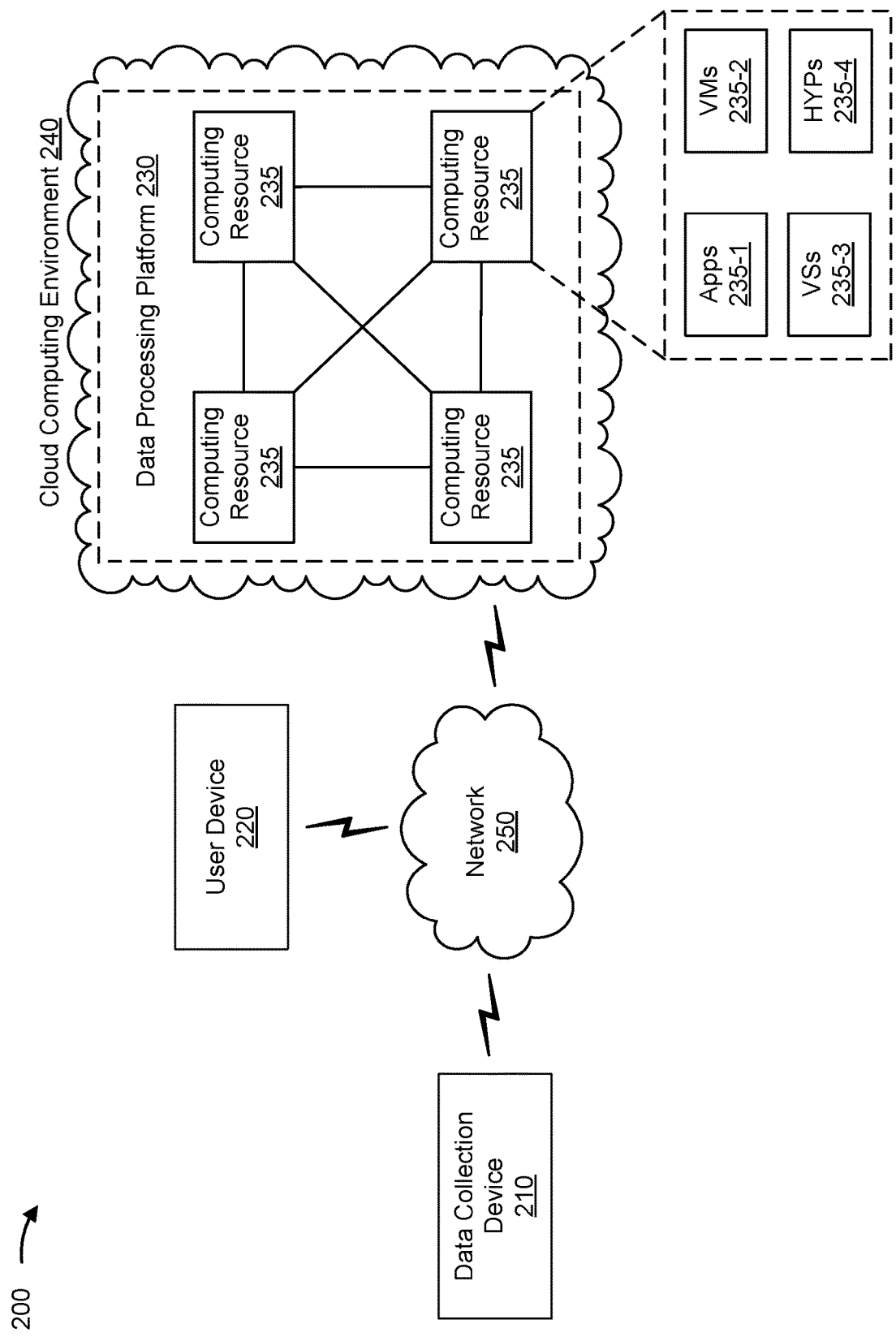
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a data collection device 210, a user device 220, a data processing platform 230, a computing resource 235, a cloud computing environment 240, and a network 250. Devices of environment 200 can interconnect via wired connections, wireless connections, or a combination of wired and wireless connections.

Data collection device 210 includes one or more devices (e.g., electronic devices) capable of collecting and reporting readings. For example, data collection device 210 can include a computing device associated with a modem, a radio transceiver, an Ethernet interface, and/or the like (e.g., a telematics device, a smart phone, a tablet computer, a handheld computer, a sensor device, an IoT device, etc.), or a similar device capable of communication functions. In some implementations, data collection device 210 can include one or more sensors for detecting and collecting readings of a measurable parameter. In some implementations, data collection device 210 can receive information from, and/or transmit information to, data processing platform 230.

User device 220 includes one or more devices capable of receiving, generating, storing, processing, and/or providing information associated with readings collected by data collection device 210. For example, user device 220 can include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Data processing platform 230 includes one or more computing resources associated with processing readings collected by data collection device 210. For example, data processing platform 230 can be a platform implemented by cloud computing environment 240 that can obtain readings collected by a remote device (e.g., data collection device 210) and process the readings (e.g., perform a data compression or decompression technique on the readings, provide the readings to user device 220, perform an analysis based on the readings, perform one or more actions based on the readings, etc.). In some implementations, data processing platform 230 is implemented by computing resources 235 of cloud computing environment 240.

Data processing platform 230 can include a server device or a group of server devices. In some implementations, data processing platform 230 can be hosted in cloud computing environment 240. Notably, while implementations described herein describe data processing platform 230 as being hosted in cloud computing environment 240, in some implementations, data processing platform 230 can be non-cloud-based or can be partially cloud-based.

Cloud computing environment 240 includes an environment that delivers computing as a service, whereby shared resources, services, etc. can be provided to data collection device 210, user device 220, and/or the like. Cloud computing environment 240 can provide computation, software, data access, storage, and/or other services that do not require end-user knowledge of a physical location and configuration of a system and/or a device that delivers the services. As shown, cloud computing environment 240 can include data processing platform 230 and computing resource 235.

Computing resource 235 includes one or more personal computers, workstation computers, server devices, or another type of computation and/or communication device. In some implementations, computing resource 235 can host data processing platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by data collection device 210 and/or user device 220. Application 235-1 can eliminate a need to install and execute the software applications on data collection device 210 and/or user device 220. For example, application 235-1 can include software associated with data processing platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program and can support a single process. In some implementations, virtual machine 235-2 can execute on behalf of a user (e.g., data collection device 210 and/or user device 220), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200. For example, data processing platform 230 can perform one or more functions described as being performed by data collection device 210 and/or data collection device 210 can perform one or more functions described as being performed by data processing platform 230.

Figure 3:
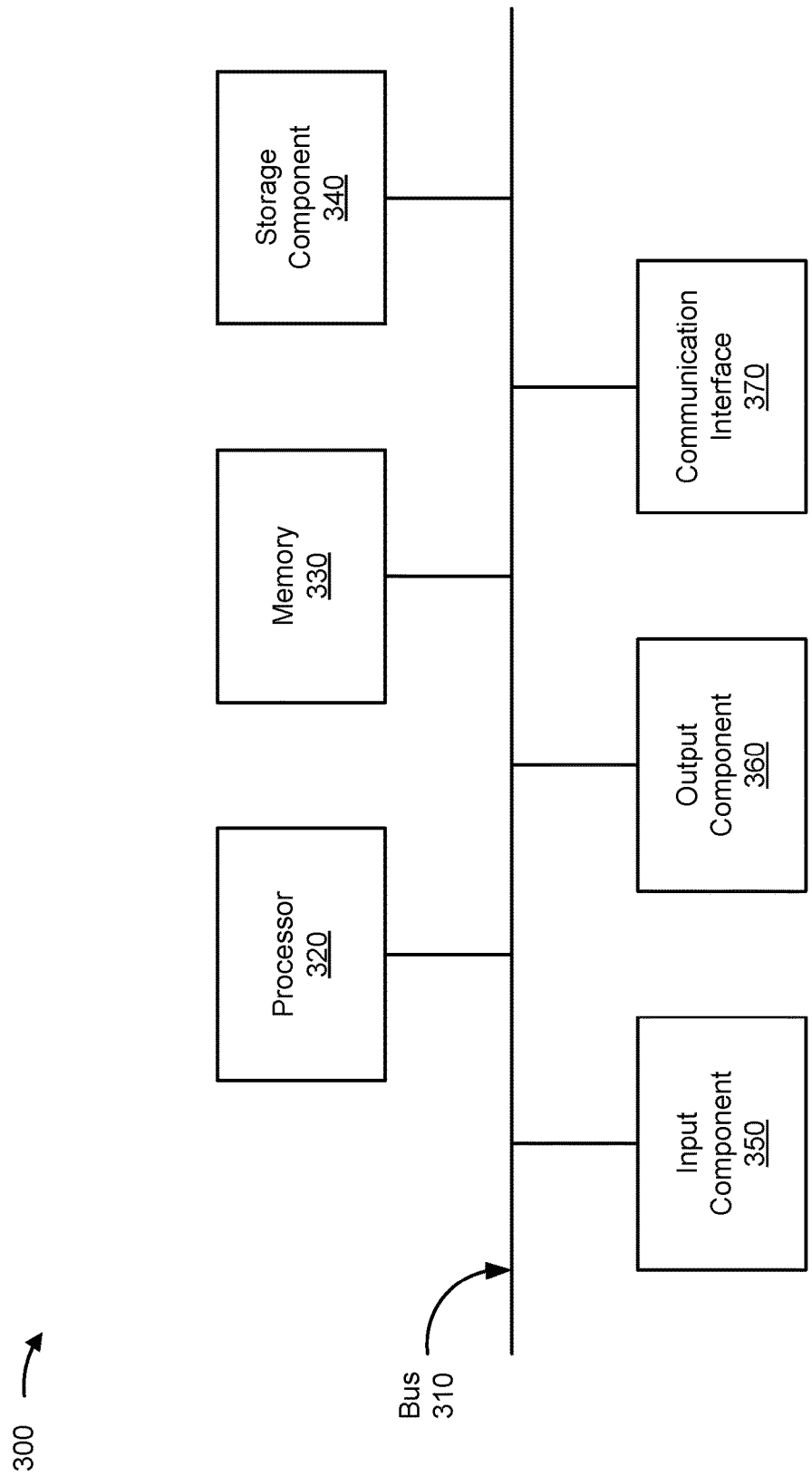
FIG. 3 is a diagram of example components of one or more devices of FIG. 2.

FIG. 3 is a diagram of example components of a device 300. Device 300 can correspond data collection device 210, user device 220, data processing platform 230, and/or computing resource 235. In some implementations, data collection device 210, user device 220, data processing platform 230, and/or computing resource 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
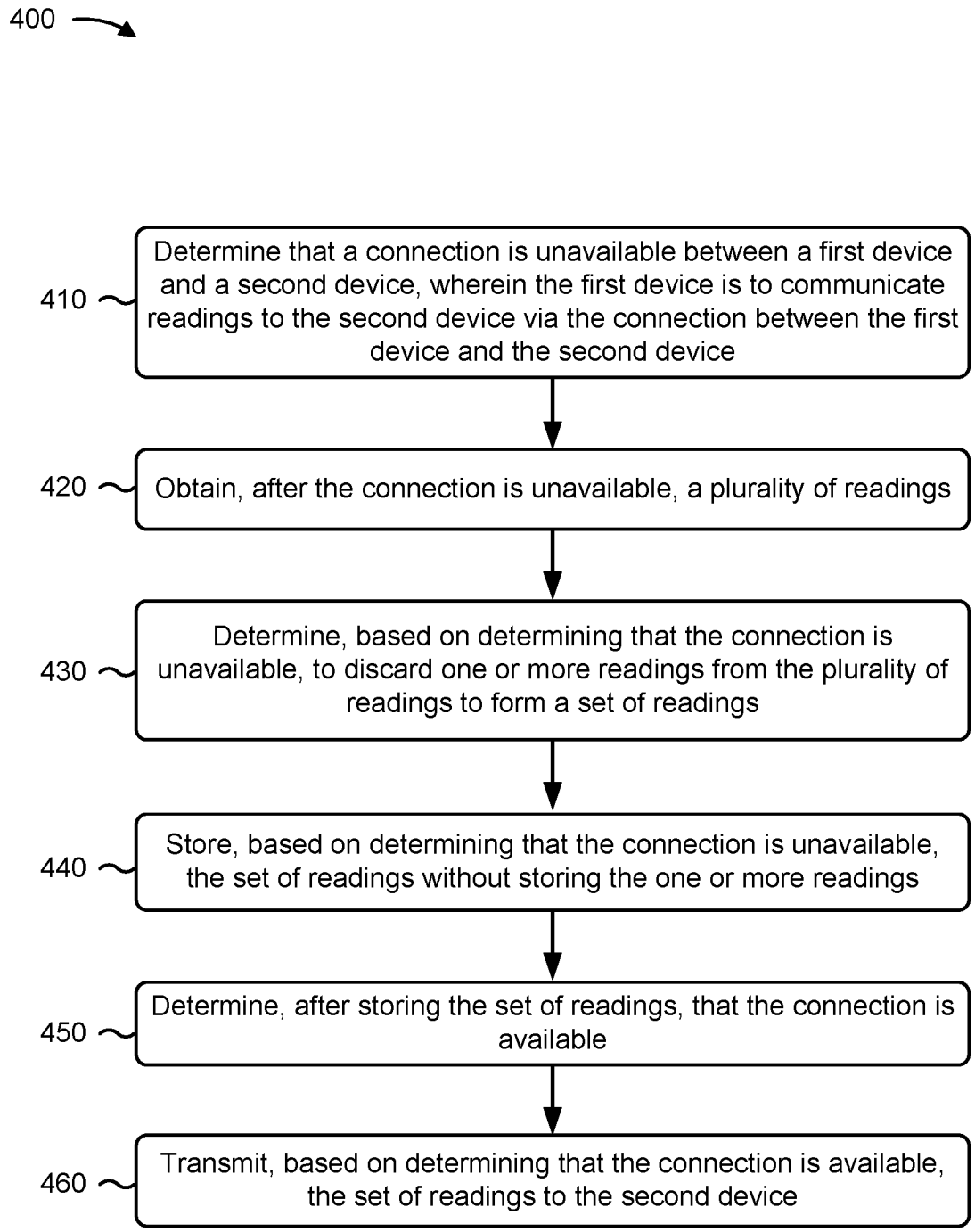
FIG. 4 is a flow chart of an example process for reducing data storage and network traffic with data compression.

FIG. 4 is a flow chart of an example process 400 for reducing data storage and network traffic with data compression. In some implementations, one or more process blocks of FIG. 4 can be performed by a data collection device (e.g., data collection device 210). In some implementations, one or more process blocks of FIG. 4 can be performed by another device or a group of devices separate from or including the data collection device, such as a user device (e.g., user device 220), a data processing platform (e.g., data processing platform 230), and/or the like.

As shown in FIG. 4, process 400 can include determining that a connection is unavailable (block 410). For example, the data collection device (e.g., using processor 320, memory 330, storage component 340, communication interface 370, and/or the like) can determine that a connection is unavailable, as described above.

As further shown in FIG. 4, process 400 can include obtaining, after the connection is unavailable, a plurality of readings (block 420). For example, the data collection device (e.g., using processor 320, memory 330, storage component 340, input component 350, and/or the like) can obtain, after the connection is unavailable, a plurality of readings, as described above.

As further shown in FIG. 4, process 400 can include determining, based on determining that the connection is unavailable, to discard one or more readings from the plurality of readings to form a set of readings (block 430). For example, the data collection device (e.g., using processor 320, memory 330, storage component 340, and/or the like) can determine, based on determining that the connection is unavailable, to discard one or more readings from the plurality of readings to form a set of readings, as described above.

As further shown in FIG. 4, process 400 can include storing, based on determining that the connection is unavailable, the set of readings without storing the one or more readings (block 440). For example, the data collection device (e.g., using processor 320, memory 330, storage component 340, and/or the like) can store, based on determining that the connection is unavailable, the set of readings without storing the one or more readings, as described above.

As further shown in FIG. 4, process 400 can include determining, after storing the set of readings, that the connection is available (block 450). For example, the data collection device (e.g., using processor 320, memory 330, storage component 340, communication interface 370, and/or the like) can determine, after storing the set of readings, that the connection is available, as described above.

As further shown in FIG. 4, process 400 can include transmitting, based on determining that the connection is available, the set of readings to a device (block 460). For example, the data collection device (e.g., using processor 320, memory 330, storage component 340, output component 360, communication interface 370, and/or the like) can transmit, based on determining that the connection is available, the set of readings to a device, as described above.

Process 400 can include additional implementations, such as any single implementation or any combination of implementations described below and/or in connection with one or more other processes described elsewhere herein.

In some implementations, the plurality of readings can include a first reading, a second reading, and a third reading. In some implementations, the first reading is associated with a first time, the second reading is associated with a second time, and the third reading is associated with a third time, where the first time is prior to the second time and the third time, and the second time is prior to the third time. In some implementations, determining to discard the one or more readings can include determining a maximum difference of one of a first difference between the first reading and the second reading, or a second difference between the second reading and the third reading; determining a difference between the second reading and a value derived from linear interpolation based on the first reading at the first time, the second time, and the third reading at the third time; determining whether the difference is less than or equal to the maximum difference multiplied by a weight; and determining to discard the second reading based on determining that the difference is less than or equal to the maximum difference multiplied by the weight. In some implementations, the weight is greater than or equal to 0 and less than or equal to 1.

In some implementations, the plurality of readings can include a fourth reading. In some implementations, the fourth reading is associated with a fourth time, where the fourth time is later than the third time. In some implementations, determining to discard the second reading can include determining not to discard the second reading from the plurality of readings based on determining that the difference is greater than the maximum difference multiplied by the weight; determining a new maximum difference of one of a third difference between the second reading and the third reading, or a fourth difference between the third reading and the fourth reading; determining a new difference between the third reading and a new value derived from linear interpolation based on the second reading at the second time, the third time, and the fourth reading at the fourth time; determining whether the new difference is less than or equal to the new maximum difference multiplied by the weight; and determining to discard the third reading based on determining that the new difference is less than or equal to the new maximum difference multiplied by the weight. In some implementations, the data collection device can determine to discard the second reading from the plurality of readings based on determining that the difference is less than or equal to a measurement error value of the data collection device. In some implementations, the data collection device is a sensor device.

In some implementations, the set of readings is a first set of readings. In some implementations, prior to determining that the connection is available, the data collection device can determine whether a storage total of the first set of readings satisfies a threshold value. In some implementations, based on determining that the storage total of the first set of readings satisfies the threshold value, the data collection device can discard one or more stored readings from the first set of readings to form a second set of readings, where transmitting the set of readings to the device includes transmitting the second set of readings to the device.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   determining, by a first device, that a connection is unavailable between the first device and a second device,
      wherein the first device is to communicate readings to the second device via the connection between the first device and the second device;
   obtaining, by the first device and after the connection is unavailable, a plurality of readings,
      wherein the plurality of readings includes a first reading, a second reading, and a third reading,
         wherein the first reading is associated with a first time, the second reading is associated with a second time, and the third reading is associated with a third time, and
            wherein the first time is prior to the second time and the third time, and the second time is prior to the third time;
   determining, by the first device, a maximum difference of one of:
      a first difference between the first reading and the second reading, or
      a second difference between the second reading and the third reading;
   determining, by the first device, a difference between the second reading and a value derived from linear interpolation based on the first reading at the first time, the second reading at the second time, and the third reading at the third time;
   determining, by the first device, whether the difference is less than or equal to the maximum difference multiplied by a weight;
   determining, by the first device and based on determining that the difference is less than or equal to the maximum difference multiplied by the weight, to discard one or more readings from the plurality of readings to form a set of readings;
   storing, by the first device and based on determining that the connection is unavailable, the set of readings without storing the one or more readings;
   determining, by the first device and after storing the set of readings, that the connection is available; and
   transmitting, by the first device and based on determining that the connection is available, the set of readings to the second device.

2. The method of claim 1, wherein the weight is greater than or equal to 0 and less than or equal to 1.

3. The method of claim 1, wherein the plurality of readings includes a fourth reading,
   wherein the fourth reading is associated with a fourth time,
      wherein the fourth time is later than the third time,
   wherein determining to discard the second reading comprises:
      determining not to discard the second reading from the plurality of readings based on determining that the difference is greater than the maximum difference multiplied by the weight;
      determining a new maximum difference of one of:
         a third difference between the second reading and the third reading, or
         a fourth difference between the third reading and the fourth reading;
      determining a new difference between the third reading and a new value derived from linear interpolation based on the second reading at the second time, the third time, and the fourth reading at the fourth time;
      determining whether the new difference is less than or equal to the new maximum difference multiplied by the weight; and
      determining to discard the third reading based on determining that the new difference is less than or equal to the new maximum difference multiplied by the weight.

4. The method of claim 1, further comprising:
   determining to discard the second reading from the plurality of readings based on determining that the difference is less than or equal to a measurement error value of the first device.

5. The method of claim 1, wherein the first device is a sensor device.

6. The method of claim 1, wherein the set of readings is a first set of readings,
   wherein, prior to determining that the connection is available, the method further comprises:
      determining whether a storage total of the first set of readings satisfies a threshold value; and
      determining, based on determining that the storage total of the first set of readings satisfies the threshold value, to discard one or more stored readings from the first set of readings to form a second set of readings,
         wherein transmitting the set of readings to the second device comprises transmitting the second set of readings to the second device.

7. The method of claim 1, wherein the plurality of readings are obtained based upon an occurrence of an event.

8. The method of claim 1, wherein the plurality of readings are obtained at regular intervals.

9. A data collection device, comprising:
   one or more memories; and
   one or more processors, communicatively coupled to the one or more memories, to:
      determine that a connection is unavailable between the data collection device and a device,
         wherein the data collection device is to communicate readings to the device via the connection between the data collection device and the device;
      obtain, after the connection is unavailable, a plurality of readings, and
         wherein the plurality of readings includes a first reading, a second reading, and a third reading,
            wherein the first reading is associated with a first time, the second reading is associated with a second time, and the third reading is associated with a third time,
               wherein the first time is prior to the second time and the third time, and the second time is prior to the third time;
      determine a maximum difference of one of:
         a first difference between the first reading and the second reading, or
         a second difference between the second reading and the third reading;
      determine a difference between the second reading and a value derived from linear interpolation based on the first reading at the first time, the second reading at the second time, and the third reading at the third time;
      determine whether the difference is less than or equal to the maximum difference multiplied by a weight;

determine, based on determining that the difference is less than or equal to the maximum difference multiplied by the weight, to discard one or more readings from the plurality of readings to form a set of readings;

store, based on determining that the connection is unavailable, the set of readings without storing the one or more readings;

determine, after storing the set of readings, that the connection is available; and transmit, based on determining that the connection is available, the set of readings to the device.

10. The data collection device of claim 9, wherein the weight is greater than or equal to 0 and less than or equal to 1.

11. The data collection device of claim 9, wherein the plurality of readings includes a fourth reading, wherein the fourth reading is associated with a fourth time, wherein the fourth time is later than the third time, wherein the one or more processors, when determining to discard the second reading, are to:

determine not to discard the second reading from the plurality of readings based on determining that the difference is greater than the maximum difference multiplied by the weight;

determine a new maximum difference of one of:
a third difference between the second reading and the third reading, or
a fourth difference between the third reading and the fourth reading;

determine a new difference between the third reading and a new value derived from linear interpolation based on the second reading at the second time, the third time, and the fourth reading at the fourth time;

determine whether the new difference is less than or equal to the new maximum difference multiplied by the weight; and determine to discard the third reading based on determining that the new difference is less than or equal to the new maximum difference multiplied by the weight.

12. The data collection device of claim 9, wherein the one or more processors are further to:

determine to discard the second reading from the plurality of readings based on determining that the difference is less than or equal to a measurement error value of the data collection device.

13. The data collection device of claim 9, wherein the data collection device is a sensor device.

14. The data collection device of claim 9, wherein the set of readings is a first set of readings, wherein the one or more processors, prior to determining that the connection is available, are to:

determine whether a storage total of the first set of readings satisfies a threshold value; and determine, based on determining that the storage total of the first set of readings satisfies the threshold value, to discard one or more stored readings from the first set of readings to form a second set of readings, wherein transmitting the set of readings to the device comprises transmitting the second set of readings to the device.

15. The data collection device of claim 9, wherein the plurality of readings are obtained based upon an occurrence of an event.

16. A non-transitory computer-readable medium storing instructions, the instructions comprising:

one or more instructions that, when executed by one or more processors, cause the one or more processors to:

determine that a connection is unavailable between a first device and a second device, wherein the first device is to communicate readings to the second device via the connection between the first device and the second device;

obtain, after the connection is unavailable, a plurality of readings, and wherein the plurality of readings includes a first reading, a second reading, and a third reading, wherein the first reading is associated with a first time, the second reading is associated with a second time, and the third reading is associated with a third time, and wherein the first time is prior to the second time and the third time, and the second time is prior to the third time;

determine a maximum difference of one of:
a first difference between the first reading and the second reading, or
a second difference between the second reading and the third reading;

determine a difference between the second reading and a value derived from linear interpolation based on the first reading at the first time, the second reading at the second time, and the third reading at the third time;

determine whether the difference is less than or equal to the maximum difference multiplied by a weight;

determine, based on determining that the difference is less than or equal to the maximum difference multiplied by the weight, to discard one or more readings from the plurality of readings to form a set of readings;

store, based on determining that the connection is unavailable, the set of readings without storing the one or more readings;

determine, after storing the set of readings, that the connection is available; and transmit, based on determining that the connection is available, the set of readings to the second device.

17. The non-transitory computer-readable medium of claim 16, wherein the weight is greater than or equal to 0 and less than or equal to 1.

18. The non-transitory computer-readable medium of claim 16, wherein the plurality of readings includes a fourth reading, wherein the fourth reading is associated with a fourth time, wherein the fourth time is later than the third time, wherein the one or more instructions, that cause the one or more processors to determine to discard the second reading, cause the one or more processors to:

determine not to discard the second reading from the plurality of readings based on determining that the difference is greater than the maximum difference multiplied by the weight;

determine a new maximum difference of one of:
a third difference between the second reading and the third reading, or
a fourth difference between the third reading and the fourth reading;

determine a new difference between the third reading and a new value derived from linear interpolation based on the second reading at the second time, the third time, and the fourth reading at the fourth time;

determine whether the new difference is less than or equal to the new maximum difference multiplied by the weight; and determine to discard the third reading based on determining that the new difference is less than or equal to the new maximum difference multiplied by the weight.

19. The non-transitory computer-readable medium of claim 16, wherein the one or more instructions, when executed by the one or more processors, further cause the one or more processors to:

determine to discard the second reading from the plurality of readings based on determining that the difference is less than or equal to a measurement error value of the first device.

20. The non-transitory computer-readable medium of claim 16, wherein the set of readings is a first set of readings, wherein the one or more instructions, when executed by the one or more processors, prior to determining that the connection is available, further cause the one or more processors to:

determine whether a storage total of the first set of readings satisfies a threshold value; and determine, based on determining that the storage total of the first set of readings satisfies the threshold value, to discard one or more stored readings from the first set of readings to form a second set of readings, wherein transmitting the set of readings to the second device comprises transmitting the second set of readings to the second device.

\* \* \* \* \*